(12) United States Patent
Ling et al.

(10) Patent No.: US 11,090,743 B2
(45) Date of Patent: Aug. 17, 2021

(54) MUTUAL-LAPPING DEVICE FOR IMPROVING GEAR MACHINING ACCURACY AND THE MUTUAL-LAPPING METHOD THEREOF

(71) Applicant: DALIAN UNIVERSITY OF TECHNOLOGY, Liaoning (CN)

(72) Inventors: Siying Ling, Liaoning (CN); Xunlian Wang, Liaoning (CN); Ming Ling, Liaoning (CN); Yilei Chen, Liaoning (CN); Huiyang Zhang, Liaoning (CN); Xiaodong Wang, Liaoning (CN); Liding Wang, Liaoning (CN)

(73) Assignee: Dalian University of Technology, Liaoninig (CN)

( * ) Notice: Subject to any disclaimer, the term of this patent is extended or adjusted under 35 U.S.C. 154(b) by 0 days.

(21) Appl. No.: 16/969,344

(22) PCT Filed: May 9, 2018

(86) PCT No.: PCT/CN2018/086176
§ 371 (c)(1),
(2) Date: Aug. 12, 2020

(87) PCT Pub. No.: WO2019/213872
PCT Pub. Date: Nov. 14, 2019

(65) Prior Publication Data
US 2021/0046565 A1    Feb. 18, 2021

(51) Int. Cl.
*B23F 19/02* (2006.01)
*B23F 15/00* (2006.01)
*B23F 1/02* (2006.01)

(52) U.S. Cl.
CPC ............. *B23F 19/02* (2013.01); *B23F 1/02* (2013.01); *B23F 15/00* (2013.01); *Y10T 29/49462* (2015.01); *Y10T 29/49467* (2015.01)

(58) Field of Classification Search
CPC .. B23F 19/02; B23F 19/00; B23F 1/00; B23F 1/02; B23F 15/00; Y10T 29/49462; Y10T 29/49467
See application file for complete search history.

(56) References Cited

U.S. PATENT DOCUMENTS 2,942,389 A * 6/1960 Praeg .................. B23F 19/05
451/47
3,329,037 A * 7/1967 Stott .................. F16H 55/08
74/437

(Continued)

FOREIGN PATENT DOCUMENTS

CN    102139239 A    8/2011
CN    204248127 U    4/2015
(Continued)

*Primary Examiner* — Ryan J. Walters
(74) *Attorney, Agent, or Firm* — Muncy, Geissler, Olds & Lowe, P.C.

(57) ABSTRACT

A mutual-lapping device and mutual-lapping method for improving processing precision based on the principle of error averaging is proposed. The device including driving friction wheel, driving belt pulley, transmission belt A, connecting rod A, rotation shaft segment A, multi-ball sleeve, mutual-lapping gear A, tension spring, driven friction wheel, pendulum bar of the driven friction wheel, driven belt pulley, transmission belt B, connecting rod B, pressure spring of tensioning pulley, tensioner mechanism, rotation shaft segment B and mutual-lapping gear B. By mutual lapping the high-precision gears, not only the pitch deviation, tooth profile deviation, helix deviation and runout can be reduced synchronously, but also the machining cost is low. Meanwhile, the effect of improving pitch accuracy, profile accuracy, helix accuracy and runout accuracy and reducing surface roughness is remarkable.

9 Claims, 1 Drawing Sheet

(56) References Cited

U.S. PATENT DOCUMENTS

| | | | | |
|---|---|---|---|---|
| 4,476,654 A | * | 10/1984 | Eng | B23F 19/02 |
| | | | | 451/114 |
| 4,920,703 A | * | 5/1990 | Hosoya | B21H 5/022 |
| | | | | 451/123 |
| 10,634,231 B2 | * | 4/2020 | Moetakef | F16H 1/06 |
| 2003/0040264 A1 | * | 2/2003 | Taniguchi | B23F 19/00 |
| | | | | 451/47 |
| 2017/0299039 A1 | * | 10/2017 | Moetakef | F16H 55/16 |

FOREIGN PATENT DOCUMENTS

| | | |
|---|---|---|
| CN | 107063678 A | 8/2017 |
| EP | 1332823 A1 | 8/2003 |

* cited by examiner

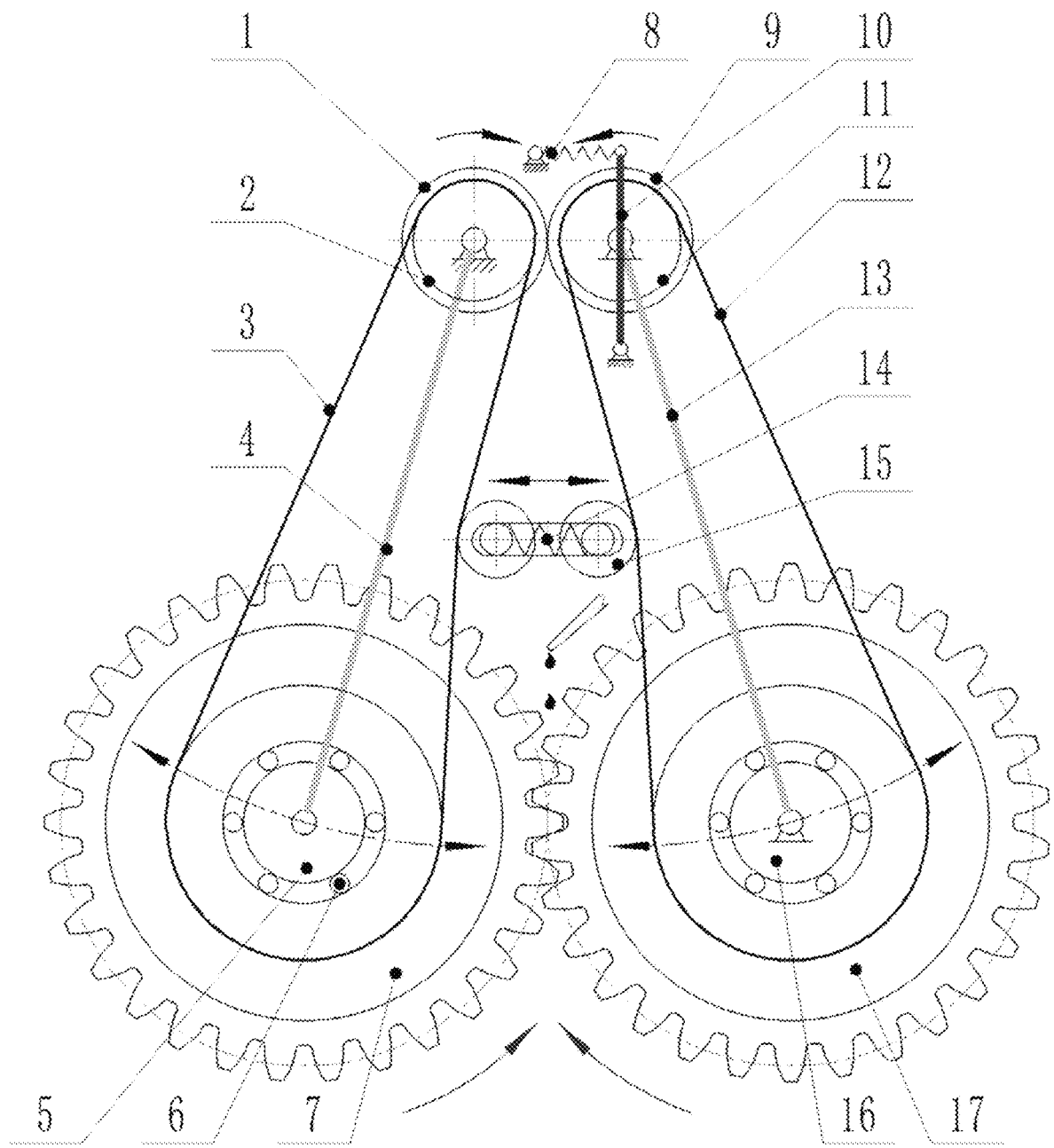

MUTUAL-LAPPING DEVICE FOR IMPROVING GEAR MACHINING ACCURACY AND THE MUTUAL-LAPPING METHOD THEREOF

FIELD OF THE INVENTION

The present invention belongs to the technical field of precision machining, which relates to a mutual-lapping device and mutual-lapping method for improving gear machining accuracy.

BACKGROUND

With the development and progress of science and technology, there is a growing demand for ultra-precision machining, especially the master gears used for the gear values transfer benchmark, which has higher machining accuracy requirements. At present, the High-precision Gear Research Laboratory of Dalian University of Technology has developed a scientific grinding process by refining the grinding machine and realized the machining of master gears with Class-1 accuracy, according to the international standard ISO 1328-1:2013 (E) and the gear national standard GB/T 10095.1-2008, which won the first prize of 2017 China Machinery Industry Science and Technology. The machining accuracy of gears is improved by 1 class and the machining cost will be doubled. Therefore, it is imperative to reduce the machining cost of the gear with class-1 accuracy and improve the machining efficiency of the gear with class-1 accuracy. If the accuracy of the finished gear can be improved 1-2 classes, it will be very significance to reduce the machining cost of high precision gears and promote the application of high precision gears in high-end equipment transmission systems both at home and abroad.

Besides the high machining cost and low machining efficiency, it is difficult to improve the surface roughness of gear with class-1 accuracy by grinding. In the practice of grinding process, the highest tooth surface roughness can reach to Ra0.2 by using grinding method, and larger tooth surface roughness will increase the measurement uncertainty of master gear and affect the performance of master gear.

SUMMARY

In order to further improve the machining accuracy of the ultra-precision gear, the present invention proposes a mutual-lapping device and mutual-lapping method for gear based on the principle of error averaging. By mutual-lapping of the high-precision gears that mesh with each other, the pitch deviation, profile deviation, helix deviation and runout of the gears can be reduced synchronously, and the tooth surface roughness can also be significantly reduced.

The specific technical solutions are as follows:

A mutual-lapping device method for improving gear machining accuracy, including driving friction wheel, driving belt pulley, transmission belt A, connecting rod A, rotation shaft segment A, multi-ball sleeve, mutual-lapping gear A, tension spring, driven friction wheel, pendulum bar of the driven friction wheel, driven belt pulley, transmission belt B, connecting rod B, pressure spring of tensioning pulley, tensioning mechanism, rotation shaft segment B and mutual-lapping gear B.

the driving friction wheel that is driven by the motor rotates around fixed rotary center. The driving belt pulley is rigidly coaxially connected with the driving friction wheel, and it's rotary center coincides with the rotary center of one end of the connecting rod A; The other end of the connecting rod A is connected with the rotation shaft segment A, and the mutual-lapping gear A rotates with the rotation shaft segment A that is fixed on the connecting rod A by the multi-ball sleeve.

the driven friction wheel driven by the driving friction wheel rotates around the pendulum bar of the driven friction wheel. One end of the pendulum bar of the driven friction wheel is fixed, and the other end pulls the driven friction wheel to the driving friction wheel by the tension spring. Therefore, a suitable friction force is generated between the two friction wheels, which drives the two friction wheels to rotate in opposite directions; One end of connecting rod B rotates around the rotary center of the pendulum bar of the driven friction wheel and the rotary center of connecting rod B coincides with the rotary center of the driven belt pulley and the driven friction wheel; The other end of the connecting rod B is connected to the rotation shaft segment B, and the mutual-lapping gear B rotates with the rotation shaft segment B fixed on the connecting rod B by the multi-ball sleeve.

Furthermore, in the above device, the pressure spring is used to push the two tensioners opposite installed to ensure that the force between the transmission belt A and transmission belt B is same; by adjusting the position of the tensioning mechanism, the tensioning force of the transmission belt A and transmission belt B can be synchronously adjusted.

Furthermore, the center distance of the driving belt pulley and the driven belt pulley is smaller than the center distance of mutual-lapping gear A and mutual-lapping gear B so that the two mutual-lapping gears are pressed against each other by gravity and realizing the backlash-free meshing transmission of the two mutual-lapping gears.

Furthermore, the transmission ratio of the above two belt drives is consistent with the transmission ratio of the mutual-lapping gear, and the relative error of the transmission ratio is no more than 2%.

Furthermore, the above mutual-lapping device is mounted on an inclined table at tilt angle of 70°~80° to the horizontal plane, and the two mutual-lapping gears are pressed against the table surface by gravity so that the axial location datum of two mutual-lapping gears is coplanar; the rotary center of the two mutual-lapping gears fluctuates, and the center distance is adjusted automatically according to the deviation of mutual-lapping gears.

A mutual-lapping method of above mutual-lapping device for improving gear machining accuracy is that dividing the rotational motion of motor into the two opposite rotation motions of the driving belt pulley and the driven belt pulley by precision driving friction wheel and derived friction wheel, and then driven the mutual-lapping gear A and the mutual-lapping gear B by belt drive respectively to ensure the transmission ratio of the two belt drives is consistent with the transmission ratio of the mutual-lapping gear, and the relative error of the transmission ratio is no more than 2%. The operation steps of the mutual-lapping method are as follows:

(1) Number each tooth of the mutual-lapping gear A and the mutual-lapping gear B, and then configure grinding fluid with suitable particle size;

(2) First, the left or right tooth flank of the No. 1 tooth of the mutual-lapping gear A is meshed with the left or right tooth flank of the No. 1 tooth of the mutual-lapping gear B, and the mutual-lapping gears are automatically anti-backlash by gravity;

(3) Turn off the motor after the motor rotating forward and reversal alternately for a period of time t;

(4) Pull out one side of the connecting rod A or the connecting rod B to disengage the two mutual-lapping gears from the engaging state while the driving belt and the driven belt are relaxed;

(5) Rotate at the angle of one tooth of any mutual-lapping gears and put down the connecting rod A or connecting rod B so that the mutual-lapping gear A meshes with the mutual-lapping gear B again while the two pulleys are in tension;

(6) Start the motor and continue lapping according to the operation method in step 3 and make sure that the each mutual-lapping time t and the mutual-lapping strategy stay the same;

(7) Repeat steps (4)-(6) until a mutual-lapping cycle T, that is, one tooth flank meshes with all the same side tooth flank of the mutual-lapping gear;

(8) Repeat the above steps to complete an even times of mutual-lapping cycles 2kT, where k is an integer greater than 1.

The invention has the beneficial effects that the invention provides a mutual-lapping device and mutual-lapping method for improving machining accuracy based on the error averaging effect of the tooth flank deviation. The driving way is that the rotational motion of motor is divided into the two opposite rotation motions of the driving belt pulley and the driven belt pulley by precision driving friction wheel and derived friction wheel, and then the mutual-lapping gears meshed with each other are driven by belt drive respectively. The transmission ratio of the two belt drives is consistent with the transmission ratio of the mutual-lapping gears so as to improve the pitch accuracy and further improve the runout accuracy of the mutual-lapping gears. Improving the accuracy of the axial location datum of the two mutual-lapping gears can reduce the helix deviation. The tooth profile accuracy can be improved by the dynamic force during the mutual-lapping process and the error averaging effect of the tooth profile deviation. By mutual lapping the high-precision gears, not only the pitch deviation, tooth profile deviation, helix deviation and runout can be reduced synchronously, but also the machining cost is low. Meanwhile, the effect of improving pitch accuracy, profile accuracy, helix accuracy and runout accuracy and reducing surface roughness is remarkable. The mutual-lapping method provided by the invention can be extended to the mutual-lapping of gear pairs of high-end transmission devices, which has good market application prospect and popularization value.

BRIEF DESCRIPTIONS OF THE DRAWINGS

Sole FIGURE Mutual-lapping device.

In the sole FIGURE driving friction wheel; 2 driving belt pulley; 3 transmission belt A; 4 connecting rod A; 5 rotation shaft segment A; 6 multi-ball sleeve; 7 mutual-lapping gear A; 8 tension spring; 9 driven friction wheel; 10 pendulum bar of the driven friction wheel; 11 driven belt pulley; 12 transmission belt B; 13 connecting rod B; 14 pressure spring of tensioning pulley; 15 tensioning mechanism; 16 rotation shaft segment B; 17 mutual-lapping gear B.

DETAILED DESCRIPTION

Taking the disclosed self-reference master gear (CN107063678A) as the mutual-lapping gear, the specific implementation of the mutual-lapping device and the mutual-lapping method for improving the machining accuracy proposed by the invention is described.

1. The Structure of the Mutual-Lapping Device.

A mutual-lapping device for improving machining accuracy, including driving friction wheel 1, driving belt pulley 2, transmission belt A 3, connecting rod A 4, rotation shaft segment A 5, multi-ball sleeve 6, mutual-lapping gear A 7, tension spring 8, driven friction wheel 9, pendulum bar of the driven friction wheel of the driven friction wheel 10, driven belt pulley 11, transmission belt B 12, connecting rod B 13, pressure spring of tensioning pulley 14, tensioning mechanism 15, rotation shaft segment B 16, mutual-lapping gear B 17.

The reference diameter of the mutual-lapping gears (A 7, B 17) is 120 mm, the diameter of the two friction wheels (1, 9) is 36 mm, the diameter of the two pulleys is 30 mm, and the length of the connecting rod is 150 mm. The axial widths of the two friction wheels (1, 9) are both greater than 20 mm, and the material with larger friction coefficient is selected. For the self-reference master gear (CN1070636786A) proposed by the disclosed invention patent, the radial reference cylindrical surface of the structure can be directly used as a pulley. The driving friction wheel 1 driven by the motor rotates around fixed the rotary center. The driving belt pulley 2 is rigidly coaxially connected with the driving friction wheel 1, and it's rotary center coincides with rotary center of one end of the connecting rod A 4; The other end of the connecting rod A 4 is connected with the rotation shaft segment A 5, and the mutual-lapping gear A 7 rotates with the rotation shaft segment A 5 fixed on the connecting rod A 4 by the multi-ball sleeve 6. The stepper or servo motor can be selected to control the forward and backward rotation and running time.

The driven friction wheel 9 driven by the driving friction wheel 1 rotates around the pendulum bar of the driven friction wheel of the driven friction wheel 10. One end of the pendulum bar of the driven friction wheel of the driven friction wheel 10 is fixed, and the other end pulls the driven friction wheel 9 to the driving friction wheel 1 by the tension of the tension spring 8. Therefore, a suitable normal pressure is generated between the two friction wheels, which generates a suitable friction force to drive the two friction wheels to rotate in opposite directions; One end of connecting rod B 13 rotates around the rotary center of the pendulum bar of the driven friction wheel of the driven friction wheel 10 and coincides with the rotary center of the driven belt pulley 11 and the driven friction wheel 9. The other end of the connecting rod B 13 is connected to the rotation shaft segment B 16, and the mutual-lapping gear B 17 rotates with the rotation shaft segment B 16 fixed on the connecting rod B 13 by the multi-ball sleeve;

The pressure spring 14 is used to push the two tensioners opposite installed to ensure that the tension between the transmission belt A 3 and transmission belt B 12 is the same; By adjusting the position of the tensioning mechanism 15, the tension force of the transmission belt A 3 and transmission belt B 12 can be synchronously adjusted;

The center distance of the driving belt pulley 2 and the driven belt pulley 11 is smaller than the center distance of mutual-lapping gear A 7 and mutual-lapping gear B 17 so that the two mutual-lapping gears are pressed against each other by gravity and realizing the backlash-free meshing transmission of the two mutual-lapping gears; the transmission ratio of the above two belt drives is consistent with the transmission ratio of the mutual-lapping gear, and the relative error of the transmission ratio is no more than 2%; The mutual-lapping device is mounted on an inclined table at tilt angle of 70° to 80° to the horizontal plane, and the two mutual-lapping gears are pressed against the table surface by gravity so that the axial location datum of two mutual-lapping gears is coplanar; The rotary center of the two mutual-lapping gears floats, and the center distance is adjusted automatically according to the deviation of mutual-lapping gears.

2. Mutual-Lapping Method

A mutual-lapping method for improving gear machining accuracy is that the rotational motion of motor is divided into the two opposite rotation motions of the driving belt pulley 2 and the driven belt pulley 11 by precision driving friction wheel 1 and derived friction wheel 9, and then the mutual-lapping gear A 7 and the mutual-lapping gear B 17 are driven by belt drive respectively to ensure the transmission ratio of the two belt drives is consistent with the transmission ratio of the mutual-lapping gears. And the relative error of the transmission ratio is no more than 2%. The operation steps are as follows:

(1) Number each tooth of the mutual-lapping gear A 7 and the mutual-lapping gear B 17, then configure grinding fluid with suitable particle size;

(2) First, the left or right tooth flank of the No. 1 tooth of the mutual-lapping gear A 7 is meshed with the left or right tooth flank of the No. 1 tooth of the mutual-lapping gear B 17, and the mutual-lapping gears automatically clearance elimination by gravity;

(3) Turn off the motor after the motor is reversed for a period of time t;

(4) Pulling out one side of the connecting rod A 4 or the connecting rod B 13 to disengage the two mutual-lapping gears from the engaging state while the driving belt 3 and the driven belt 12 are relaxed;

(5) Rotating the angle of one tooth of any mutual-lapping gears and putting down the connecting rod A 4 or connecting rod B 13 so that the mutual-lapping gear A 7 meshes with the mutual-lapping gear B 17 again while the two pulleys are in tension;

(6) Start the motor and continue lapping according to the operation method in step 3 and make sure that the each mutual-lapping time t and the mutual-lapping strategy stay the same;

(7) Repeat steps (4)-(6) until a mutual-lapping cycle T, that is, one tooth flank meshes with all the same side tooth flank of the mutual-lapping gear;

(8) Repeat the above steps to complete an even times of mutual-lapping cycles 2kT, where k is an integer greater than 1.

For master gears with equal parameters, the position of the mutual-lapping gears (A7, B17) can be exchanged to repeat the above mutual-lapping operation steps to average the error caused by the difference of the position and the gear ratio.

In practice, the master gear is firstly processed to the economic accuracy of Class 2~3 by grinding, and then the machining accuracy of the gear can be further improved to Class 1 by the mutual-lapping device and mutual-lapping method proposed in the invention patent. It will reduce the production cost of the master gear with Class-1 accuracy and improve the production efficiency of the Class-1 master gear.

3 Deviation Correction Mechanism (1) The mechanism of the grinding pressure: The gravity component of the mutual-lapping gears causes the two gears compacting each other, and then the force between the tooth surfaces is generated. In addition, due to the existence of the machining error of the radial reference cylindrical surface of the friction wheels (1, 9), the pulleys (2, 11) and mutual-lapping gears (A7, B17), the transmission ratio of the two belt drives cannot be guaranteed to be completely uniform. Because the two mutual-lapping gears (A7, B17) are in meshing state, the speed of the two mutual-lapping gears will be forced to be same. Under the effect of this mechanism, a slight slip phenomenon occurs on one side of the pulley, and a large frictional torque will be generated between the belt and the gear. The frictional torque ultimately results in a pressure between the tooth flanks of mutual-lapping gears. Therefore, the device can generate the grinding pressure under the above two mechanisms, and the material of the mutual-lapping gears (A7, B17) can be removed under the relative sliding of the tooth flanks.

(2) The mechanism of trimming the pitch deviation: If the two mutual-lapping gears (A7, B17) have no pitch deviation, the pressure between the tooth flanks will be constant and the tooth flank grinding removal of the mutual-lapping gears will also be average under the condition that the transmission ratio of the two belt drives is constant. Even if the transmission ratio of the belt drives is constant, the tooth flank pressure of the mutual-lapping gears will be unstable when the pitch deviation between the two mutual-lapping gears is large. The tooth flank grinding removal will increase when the pressure is high, which will eventually lead to the reduction of the pitch deviation of the tooth flanks. In addition, due to the effect of error reflection, the larger pitch deviation will be reduced by the homogenization of all the teeth involved in the mutual-lapping progress. Under the effect of the above two mechanisms, the pitch deviation, including single pitch deviation and total cumulative pitch deviation, will be further reduced.

(3) The mechanism of correcting the runout: The mechanism of reducing the runout is similar to the mechanism of reducing the pitch deviation. When the teeth with larger runout of the mutual-lapping gears (A7, B17) are engaged in meshing, the center distance of the two mutual-lapping gears becomes larger, and the gravity component of the two mutual-lapping gears also increases, which leads to the increase of the normal pressure between the tooth flanks. Therefore, the mechanism leads to the decreasing of the runout. In addition, due to the effect of error reflection, the larger runout will be reduced by the homogenization of all the teeth involved in the mutual-lapping progress. Under the effect of the above two mechanisms, the runout will be further reduced.

(4) The mechanism of correcting helix deviation: The helix deviation is mainly caused by the yaw during gear machining or measurement. As long as the accuracy of the axial installation datum of the gear is improved, the helix accuracy will be improved. The mutual-lapping device is mounted on an inclined table at title angle of 70°~80° to the horizontal plane, and the two mutual-lapping gears are pressed against the table surface by gravity so that the axial location datum of two mutual-lapping gears is coplanar, and the axial location datum accuracy of the two mutual-lapping gears can be guaranteed. Since the center distance of two mutual-lapping gears (A7, B17) fluctuates, the mutual-lapping gears slip slightly relative to the inclined table. A PTFE rail soft belt for precision scraping and lapping is attached to the working surface of the inclined table, and an oil groove is processed thereon, and the flatness error of the high point of the rail soft belt is less than 1 μm. In the mutual-lapping process, the area of the mutual-lapping gear high point is preferentially contacted and participates in grinding removal, which reduce the helix deviation of the gear. In addition, due to the effect of error reflection, the larger helix deviation will be reduced by the homogenization of all the teeth involved in the mutual-lapping progress. Under the effect of the above two mechanisms, the helix deviation will be further reduced.

(5) The mechanism of correcting tooth profile deviation: Due to the large tooth profile deviation of the tooth flank of the mutual-lapping gears (A7, B17), the instantaneous angular velocity and angular acceleration between the two gears will change during the mutual-lapping process, resulting in dynamic force during the sliding process between the tooth flanks. Under the effect of the dynamic force and the friction between the tooth surfaces, the relatively high point between the tooth flanks is preferentially removed. In addition, due to the effect of error reflection, the larger tooth profile deviation will be reduced by the homogenization of all the teeth involved in the mutual-lapping progress. Under the effect of the above two mechanisms, the tooth profile deviation will be further reduced. The orientation of the micro texture of the involute tooth surface is changed after the mutual-lapping, which makes it along the measurement direction of the tooth profile involute, and it is helpful to reduce the influence of the tooth surface roughness on the measurement of the involute tooth profile deviation.

If the tooth profile deviation of the two mutual-lapping gears is small, the dynamic force between the gears will also decrease. Since the frictional force between the tooth flanks is changed along the direction from the tooth root to the tooth top, the frictional friction of the tooth flanks alone cannot effectively reduce the tooth profile deviations

The invention claimed is:

1. A mutual-lapping device for improving gear machining accuracy, comprising: a driving friction wheel, a driving belt pulley, a transmission belt A), a connecting rod A, a rotation shaft segment A, multi-ball sleeve, a mutual-lapping gear A, a tension spring, a driven friction wheel, a pendulum bar of the driven friction wheel, a driven belt pulley, a transmission belt B), a connecting rod B, a pressure spring of tensioning pulley, a tensioner mechanism, a rotation shaft segment B, a mutual-lapping gear B;

the driving friction wheel driven by a motor rotates around fixed rotary center; the driving belt pulley is rigidly coaxially connected with the driving friction wheel, and the rotary center coincides with rotary center of one end of the connecting rod A; the other end of the connecting rod A is connected with the rotation shaft segment A, and the mutual-lapping gear A rotates with the rotation shaft segment A fixed on the connecting rod A by the multi-ball sleeve;

the driven friction wheel driven by the driving friction wheel rotates around the pendulum bar of the driven friction wheel; one end of the pendulum bar of the driven friction wheel is fixed, and the other end pulls the driven friction wheel to the driving friction wheel by the tension spring; therefore, a suitable friction force is generated between the two friction wheels, which drives the two friction wheels to rotate in opposite directions; one end of connecting rod B rotates around the rotary center of the pendulum bar of the driven friction wheel and the rotary center of connecting rod B coincides with the rotary center of the driven belt pulley and the driven friction wheel; the other end of the connecting rod B is connected to the rotation shaft segment B, and the mutual-lapping gear B rotates with the rotation shaft segment B fixed on the connecting rod B by the multi-ball sleeve.

2. The mutual-lapping device for improving gear machining accuracy according to claim 1, wherein the pressure spring is used to ensure that the force between the transmission belt A and transmission belt B is equal, and by adjusting the position of the tensioner mechanism, the tensioning force of the transmission belt A and transmission belt B can be synchronously adjusted.

3. The mutual-lapping device for improving gear machining accuracy according to claim 1, wherein the center distance of the driving belt pulley and the driven belt pulley is smaller than the center distance of mutual-lapping gear A and mutual-lapping gear B so that the two mutual-lapping gears are pressed against each other by gravity and realizing the backlash-free meshing transmission of the two mutual-lapping gears.

4. The mutual-lapping device for improving gear machining accuracy according to claim 3, wherein the transmission ratio of the two belt drives is consistent with the transmission ratio of the mutual-lapping gear, and the relative error of the transmission ratio is no more than 2%.

5. The mutual-lapping device for improving gear machining accuracy according to claim 3, wherein the mutual-lapping device is mounted on an inclined table at tilt angle of 70°~80° to the horizontal plane, and the two mutual-lapping gears are pressed against the table surface by gravity so that the axial location datum of two mutual-lapping gears is coplanar; the rotary center of the two mutual-lapping gears fluctuates, and the center distance is adjusted automatically according to the deviation of mutual-lapping gears.

6. The mutual-lapping device for improving gear machining accuracy according to claim 1, wherein the transmission ratio of the two belt drives is consistent with the transmission ratio of the mutual-lapping gear, and the relative error of the transmission ratio is no more than 2%.

7. The mutual-lapping device for improving gear machining accuracy according to claim 6, wherein the mutual-lapping device is mounted on an inclined table at tilt angle of 70°~80° to the horizontal plane, and the two mutual-lapping gears are pressed against the table surface by gravity so that the axial location datum of two mutual-lapping gears is coplanar; the rotary center of the two mutual-lapping gears floats, and the center distance is adjusted automatically according to the deviation of mutual-lapping gears.

8. The mutual-lapping device for improving gear machining accuracy according to claim 1, wherein the mutual-lapping device is mounted on an inclined table at tilt angle of 70°~80° to the horizontal plane, and the two mutual-lapping gears are pressed against the table surface by gravity so that the axial location datum of two mutual-lapping gears is coplanar; the rotary center of the two mutual-lapping gears fluctuates, and the center distance is adjusted automatically according to the deviation of mutual-lapping gears.

9. A mutual-lapping method using the mutual-lapping device for improving gear machining accuracy according to claim 1, wherein dividing the rotational motion of motor into the two opposite rotation motions of the driving belt pulley and the driven belt pulley by precision driving friction wheel and derived friction wheel, and then driven the mutual-lapping gear A and the mutual-lapping gear B by belt drive respectively to ensure the transmission ratio of the two belt drives is consistent with the transmission ratio of the mutual-lapping gear, and the relative error of the transmission ratio is no more than 2%; the operation steps of the mutual-lapping method are as follows:

(1) number each tooth of the mutual-lapping gear A and the mutual-lapping gear B, and then configure grinding fluid with suitable particle size;

(2) first, the left or right tooth flank of the No. 1 tooth of the mutual-lapping gear A is meshed with the left or right tooth flank of the No. 1 tooth of the mutual-lapping gear B, and the mutual-lapping gears are automatically anti-backlash by gravity;

(3) turn off the motor after the motor rotating forward and reversal alternately for a period of time t;

(4) pull out one side of the connecting rod A or the connecting rod B to disengage the two mutual-lapping gears from the engaging state while the driving belt and the driven belt are relaxed;

(5) rotate at the angle of one tooth of any mutual-lapping gears and put down the connecting rod A or connecting rod B so that the mutual-lapping gear A meshes with the mutual-lapping gear B again while the two pulleys are in tension;

(6) start the motor and continue lapping according to the operation method in step 3 and make sure that the each mutual-lapping time t and the mutual-lapping strategy stay the same;

(7) repeat steps (4)-(6) until a mutual-lapping cycle T, that is, one tooth flank meshes with all the same side tooth flank of the mutual-lapping gear;

(8) repeat the above steps to complete an even times of mutual-lapping cycles 2kT, where k is an integer greater than 1.

* * * * *